Nov. 24, 1964    J. J. HORAN    3,158,762
BILAMINAR TRANSDUCERS
Filed Dec. 27, 1962

INVENTOR.
JOHN J. HORAN
BY
AGENT

United States Patent Office 3,158,762
Patented Nov. 24, 1964

3,158,762
BILAMINAR TRANSDUCERS
John J. Horan, Willow Grove, Pa., assignor to the United States of America as represented by the Secretary of the Navy
Filed Dec. 27, 1962, Ser. No. 247,768
5 Claims. (Cl. 310—8.6)
(Granted under Title 35, U.S. Code (1952), sec. 266)

The invention described herein may be manufactured and used by or for the Government of the United States of America for governmental purposes without the payment of any royalties thereon or therefor.

This invention relates to double-bilaminar piezo-electric acoustic transducers for use in underwater sonar and more particularly relates to devices employing polarized ferroelectric materials such as barium titanate for the generation of energy.

Laminar and bilaminar transducers have been poorly suited structurally for deep immersion as compared with other, often less sensitive types. When the transducers serve as projectors, the voltage-induced stresses are additive to the hydrostatic stresses. The allowable tensile stresses are often an order of magnitude below the allowable compressive stress. The highest tensile stresses are generally developed in the areas most remote from the supports. In other words, if double-bilaminar transducers are used at water depths where hydrostatic forces are extremely high the ceramic bodies would have to be constructed of relatively large thickness in order to withstand the steady-state stresses created when the transducer is used as a receiver and the summation of the steadystate and transient stresses when the transducer is used as a pinger or projector. This construction would result in low sensitivity caused by low stress values and would further necessitate larger sonobuoys to accommodate the enlarged transducers.

Accordingly, it is an object of the present invention to utilize structural design theory and to thereby provide a thin double-bilaminar transducer which will encounter and withstand increased stress and thereby provide increased sensitivity and capacitance.

A further object of this invention is to provide a transducer wherein the air gap or pressure-release medium utilizes a minimum of space with maximum efficiency.

An additional object of the invention is to provide a transducer wherein the electrical connections to the electroded areas of the transducers are made in such a location as to allow stacking of multiple-unit transducer arrays.

Various other objects and advantages will appear from the following description of several embodiments of the invention and the novel features will be particularly pointed out hereinafter in connection with the appended claims.

Figure 1:
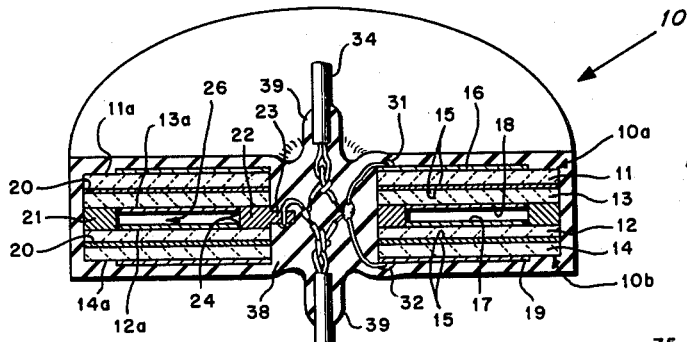
Figure 4:
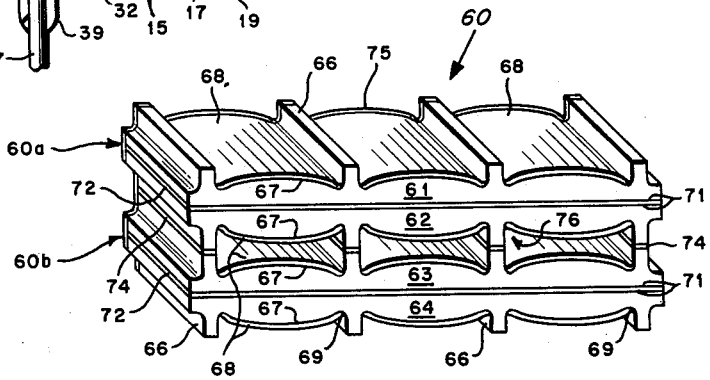
Figure 2:
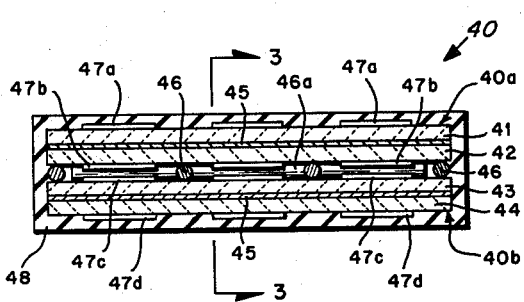
Figure 3:
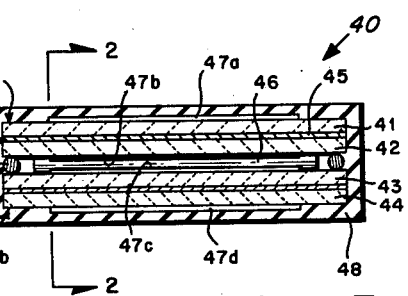
Figure 5:
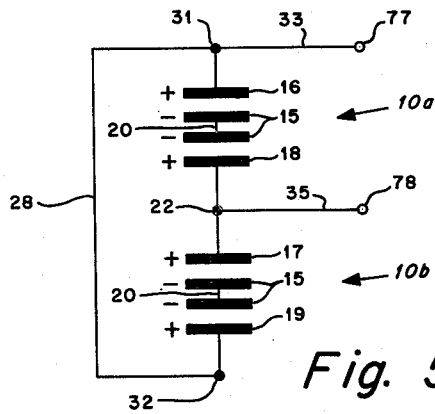

In the drawing:
FIG. 1 illustrates a pictorial view in cross section of one embodiment of the invention;
FIG. 2 is a cross-sectional view taken along the section 2—2 of FIG. 3 and illustrates a second embodiment of the invention;
FIG. 3 is a sectional view taken along section 3—3 of FIG. 2;
FIG. 4 is a pictorial view of a third embodiment of the invention with the forward-end cover plate removed to illustrate the various arrangements of parts;
FIG. 5 is a schematic diagram showing a form of prepolarization and wiring of a transducer such as that illustrated in the embodiment of FIG. 1.

Referring to FIG. 1, there is shown a double-bilaminar, piezoelectric, ceramic transducer generally noted by reference numeral 10. This transducer is comprised of upper and lower washer-shaped bilaminar elements 10a and 10b, respectively, each being further composed of upper ceramic members 11 and 12 and lower ceramic members 13 and 14. These ceramic members 11, 12, 13 and 14 may be formed of barium titanate, lead titanate zirconate, or any other appropriate polycrystalline piezoelectric. The outwardly facing surfaces 11a and 14a of ceramic members 11 and 14 have electrodes 16 and 19 of silver or other appropriate material baked thereon. Electrodes 17 and 18 are formed on the inwardly facing surfaces 12a and 13a of ceramic members 12 and 13 and are also constructed of the same material as electrodes 16 and 19. In addition, the ceramic members 11 and 13 of upper washer-like bilaminar element 10a and elements 12 and 14 of lower bilaminar transducer 10b are paired with their opposed faces 15 conductively joined by a metal filled adhesive 20.

Interposed between the two bilaminar units 10a and 10b are two circular ceramic or metallic support rings 21 and 22 which are indicated as the outer and inner support rings, respectively. As seen in FIG. 1, the outer diameter of the outer circular metallic support ring 21 conforms in extent to the outer diameter of the bilaminar units 10a and 10b. Also, the inner diameter of the inner circular metallic support ring 22 conforms in extent to the inner diameter of the bilaminar elements 10a and 10b. An inwardly projecting portion or tab 23 is formed on a small segment of the inner support ring 22 for providing electrical connection to an electrical conductor.

Referring again to FIG. 1, it is seen that the inwardly facing surfaces 12a and 13a of the ceramic members 12 and 13 are electroded only in the areas between the support rings 21 and 22 in order to avoid the possibility of including areas where the direction of stress is reversed. This is because a reversal of stress in certain zones between the existing electrodes (going from compressive to tensile or vice versa along the surface of the same electrode) will cause generation between the same electrodes of both plus and minus voltage gradients with a consequence that output cancellations will thereby be suffered. Electrical continuity between electrodes 17 and 18 is obtained by bonding electrodes 17 and 18 at point 24 to the inner support ring 22, which is formed of metal or other conducting substance.

The support rings 21 and 22 in addition to decreasing the unsupported distance or span of the ceramic elements further provides an air gap 26 which blocks the transmission of forces between the ceramic elements 10a and 10b and substantially bars the transmission of sound across the gap 26 by reason of the acoustic impedance mismatch between the ceramic and the air in the narrow gap 26.

It is within the contemplation of this invention that to provide insured electrical contact between the electrodes 17, 18 and the inner support ring 22 small tabular extensions of the silvered coating 17 and 18 may be provided and interposed between metallic support ring 22 and the ceramic members 12 and 13.

Referring again to FIG. 1, it should be noted that the conductors of the cable 34, 37 are illustrated as knotted within the center of the transducer 10 and encapsulated in a waterproof potting and coating material 38, such as vinyl or "neoprene," that covers the entire transducer and is preferably sufficiently compatible with the insulation of cable 34, 37 so that it will "wet" the cable during application and take the form as at 39.

The various electrical connections and prepolarization of the ceramic members of the embodiment of FIG. 1 is shown by the schematic drawing of FIG. 5 and will be discussed below in connection with the discussion of FIG. 5.

Referring now to FIGS. 2 and 3, wherein like numerals reflect like elements, it is seen that the transducer of this embodiment, generally indicated as 40, is of flat, rectangular configuration and comprises upper and lower bilaminar elements 40a and 40b. Each of the upper and lower bilaminar elements 40a and 40b further comprises upper and lower rectangular ceramic members 41, 42 and 43, 44, respectively; the members of each pair being sandwiched together back-to-back by means of a metal filled adhesive or other conductive cement 45 interposed therebetween.

Interposed between the bilaminar elements 40a and 40b are laterally spaced and parallel pads or supports 46. Although FIGS. 2 and 3 illustrate the pads 146 to be of rod-like configuration it is contemplated that the pad be constructed of fine square wire and alternatively may be slip cast in place on elements 42 and 43.

Each of the ceramic elements 41, 42, 43 and 44 has been zone electroded and zone prepolarized on the exposed surfaces intermediate the pads or supports 46, the electrodes being baked on or otherwise formed and illustrated by reference elements 47a, 47b, 47c and 47d. It should be noted that all of these zones indicated are zones of like initial polarization. The hydrostatic pressure due to submergence in water causes the assembly of members 41 and 42 to deflect in a manner of a uniformly loaded beam on multiple, equally spaced supports 46. An identical effect occurs in members 43 and 44. The effect is to cause tensile stress in the neighborhood of electroded areas indicated at 47b and 47c when the unit 40 is subjected to external hydrostatic pressure and compressive stress in the fibers at areas 47a and 47d.

Referring particularly to the bilaminar element 40a, it should be noted that since ceramic members 41 and 42 behave in combination as a multiply supported beam, the zone directly above the support wire 46 (adjacent the compression areas 47a) undergoes a stress reversal, it being tension in this case. The presence of stress reversals along ceramic member 41 would normally require a reversal of either the prepolarization in those areas or of the taking of leads from these areas; and in either case the silver electroding would have to be interrupted by an uncoated insulating strip. For simplicity, however, the outer and inner surfaces have been left unpolarized along the paths of the supports 46.

As is usual in beams, the neutral axis, which in this instance, coincides with electroded or conductive cement area 45 runs midway between the extreme fibers represented by the surfaces of interrupted polarizations 47a and 47b and at 45 defines the portion of the beam which is substantially unstressed. Since its initial prepolarization has been opposite that of the zones of interrupted prepolarizations 47a and 47b it might be expected that an electrical lead would be drawn from 45. This is not done in this instance, however, a more convenient method being to interconnect electroded zones 47a which are under compression and oppose them with zones 47b; it being observed that although zones 47a have the same initial prepolarization as zones 47b, the latter zones are under tensile stress which will yield a polarity opposed to that caused by compressive stresses in the former zone. Thus, elements 41, 42 may be said to be electrically in series with each other. Although the above discussion is directed to element 40a it is equally applicable to element 40b.

The transducer assembly 40 is additionally encapsulated with a waterproof coating 48 to protect the transducer from leakage and short circuiting of polarized areas.

Referring particularly to FIG. 3, which represents a cross section of FIG. 2, it is seen that the ends of the transducer are supported by additional wires or pads 46a similar to support wires 46 and that the coated and polarized zones 47b and 47c do not quite approach the supports.

Referring now to FIG. 4, there is shown another embodiment of the invention wherein the cross section between the supports is varied to make the outer fiber stress uniform in accordance with beam theory and wherein the supports are made integral with the body portion of the ceramics. Specifically, this figure illustrates a bilaminar ceramic transducer generally noted at 60 having upper and lower bilaminate elements 60a and 60b, respectively. Element 60a further comprises upper and lower ceramic body portions 61 and 62, respectively, formed from barium titanate, lead titanate zirconate or any other appropriate polycrystalline piezoelectric. Transducer element 60b is identical to element 60a and comprises upper and lower ceramic bodies 63 and 64 formed of the same material. Each of the ceramic body portions 61, 62, 63 and 64 is formed with a plurality of transversely extending integral support legs 66; FIG. 4 illustrating for equally spaced support legs on each ceramic body portion. Intermediate the support legs 66, one face of each of the ceramic bodies is formed with an arcuate surface 67 which causes the body portion in cross section to progressively vary in thickness from support leg to adjacent support leg; the body having its thickest portion in substantially a location intermediate the adjacent support legs 66. The polarization and electroding of the embodiment of FIG. 4 is similar to that illustrated in FIGS. 2 and 3 in that zone electroding and prepolarization has been applied to the exposed faces 67 of ceramic bodies 61, 62, 63 and 64 by electrodes 68 of silver or other appropriate material baked thereon. It should be noted that the electroding and prepolarization has been interrupted in the vicinity of the integral support legs 66 to avoid the energy cancellation that would occur because of reversal of stress there. FIG. 4 further shows the ceramic body portions 61, 62, 63 and 64 having planar surfaces 71 opposite the arcuate faces 67. These surfaces 71 are conductively bonded to each other by a metal filled adhesive 72 which provides a means for polarizing the surfaces 71. The joints between abutting support legs 66 are bonded with a very thin application of a strong preferably solventless cement 74 such as an epoxy formulation whereby an air gap or space 76 is formed between the bilaminar elements 60a and 60b thereby blocking the transmission of forces between the ceramic transducer elements and also barring substantial transmission of sound across the gap 76 by reason of the acoustic impedance mismatch between the ceramic and the air in the narrow gap 76. Also, in order to further seal the gap 76 at the ends, a strip or plug 75 is bonded across the end faces; FIG. 4 illustrating only the rear covering strip, the forward strip being removed in order to illustrate the included structural elements. The entire transducer assembly is then encapsulated by a coating of neoprene, vinyl or similar material, not shown, to seal the assembly against leakage and short circuiting.

Referring now to FIG. 5, there is shown a schematic diagram of the series-parallel electrical connections of the embodiment of FIG. 1 and illustrates the schematic arrangement of polarization of the embodiment of FIG. 1. This schematic illustrates a series-parallel configuration and has been selected because it permits use of the minimum number of wire interconnections. In this schematic the prepolarization of the ceramic elements has been indicated by the plus and minus signs. In FIG. 5, the two ceramic members of the upper washer-shaped element 10a are illustrated in a series connection which will permit a dynamic output to be additive and not mutually cancelling. It illustrates the upper electrode 16 and lower electrode 18 providing polarity in the positive sense and indicated by a plus sign whereas the polarity of the opposed inner faces 15 have been represented with a minus sign; the negatively prepolarized faces 15 being electrically connected together by conducting cement 20.

The ceramic members of the lower element 10b are similarly electrically connected and prepolarized as illustrated and indicated by the upper element 10a; the upper electrode 17 and lower electrode 19 being positively prepolarized as indicated by the plus sign and the opposed inner faces 15 being negatively prepolarized as indicated by the minus sign and interconnected electrically by the conducting cement 20. In this arrangement, as above, the ceramic elements are connected electrically in series. Referring to FIGS. 1 and 5, the bilaminar elements 10a and 10b are shown as being in parallel electrical connection with each other, this being accomplished by electrical lead 28 electrically connecting the upper and lower electrodes 16 and 19, respectively, at solder joints 31 and 32. This lead 28 is electrically joined to the terminal 77 by means of its connections with one of the conductors 33 of the two conductor cables 34, 37. Lower electrode 18 and upper electrode 17 are electrically connected by metallic support ring 22 and are additionally connected to terminal 78 by means of the other conductor 35 of the two conductor cables 34, 37.

It will be obvious from FIG. 1 that the joints 31 and 32 could have been made near the outer edge of the transducer in accordance with practice employed in the usual "watch stem" construction for small transducers. However, it is preferred that the central junction which the washer-type elements of this invention make possible be utilized not only because of its unique placement but because the cable can be secured compactly to the washer and knotted, affording a stronger connection that will put no load on the soldered connections and that will be more easily sealed. This construction permits stacking a number of these elements, assembled into an array, compactly in cylindrical stowage in a sonobuoy, and discharging the elements with minimum possibility of mutual entanglement in their connecting cables.

Referring again to FIGS. 1 and 5, both the series organization of members 11, 13 and 12, 14 and the parallel arrangement of elements 10a and 10b might appear incorrectly wired if judged by the arrangement used in hooking up batteries to supply power. The series array of elements 11, 13 and 12, 14 is actually correct however, since it should be noted that the upper ceramic member 11 is generally under compression (or compressive stress) when submerged in deep water and that the lower ceramic member 13 develops tensile stresses when subjected to high hydrostatic pressure. Thus, if both are polarized in the same direction, illustrated as positive in the present embodiment, they will develop charges in opposite directions because the polarity or sign of stress application obtained in the compressed upper ceramic will be opposite that in the stretched lower ceramic member.

In conclusion, it is seen that the transducers herein illustrated and described consume a minimum possible internal volume necessary for the provision of internal impedance mismatch and sound reflection, provide a flat stackable unit adapted for stowage with other components of a sonobuoy, and are capable of functioning in a flexural mode, the multiple internal supports guarding against excessive deformation and stress build-up under high hydrostatic pressure.

It will be understood that various changes in the details, materials, steps and arrangements of parts which have been herein described and illustrated in order to explain the nature of the invention may be made by those skilled in the art within the principle and scope of the invention as expressed in the appended claims.

What is claimed is:
1. In a transducer,
a first relatively thin sensitive element in the form of an annular ring having exposed faces and inner and outer circumferential areas,
a second relatively thin sensitive element in the form of an annual ring having exposed faces and inner and outer circumferential areas,
an outer metallic support ring means secured to said outer circumferential areas and an inner metallic support ring means secured to said inner circumferential areas, said ring means being interposed between said first and second annular elements for supporting said elements and forming an air gap therebetween,
and electrode means formed on said exposed faces of said first and second annular elements.
2. In a transducer,
a first pair of sensitive elements each element in the form of a relatively thin annular ring having an inner and outer circumferential area and having one face thereof conductively bonded to a face on the outer element,
a second pair of sensitive elements each element in the form of a relatively thin annular ring having an inner and outer circumferential area and having one face thereof conductively bonded to a face on the other element,
an outer and inner metallic ring means interposed between said first and second pair of sensitive elements at said outer and inner circumferential areas thereof, respectively, for supporting said elements and forming an air gap,
and electrode means formed on the exposed faces of said elements.
3. In a transducer,
first and second exterior piezoelectric members in the form of relatively thin annular rings having an outer and an innner circumferential area,
said exterior members including outwardly and inwardly extending faces,
first and second interior piezoelectric members in the form of relatively thin annular rings having an outer and an inner circumferential area,
said interior members including outwardly and inwardly extending faces,
said inwardly extending face of said first exterior member being conductively bonded to said outwardly extending face of said first interior member,
said inwardly extending face of said second exterior member being conductively bonded to said outwardly extending face of said second interior member,
an outer and inner metallic ring means interposed between said inwardly extending faces of said first and second interior members at said outer and inner cirferential areas thereof, respectively, for supporting said member and forming an air gap,
electrodes formed on said outwardly extending faces of said first and second exterior member,
and electrodes on said inwardly extending faces of said first and second interior member and being electrically connected to said inner metallic ring means.
4. In a transducer,
first and second exterior piezoelectric members in the form of a relatively thin rectangular plate each having side edges and including inwardly and outwardly extending planar faces.
first and second interior piezoelectric members in the form of a relatively thin rectangular plate each having the side edges and including outwardly and inwardly extending planar faces,
said inwardly extending face of said first exterior member being conductively bonded to said outwardly extending face of said first interior member,
said inwardly extending face of said second exterior member being conductively bonded to said outwardly extending face of said second interior member,
a plurality of parallel, laterally spaced rod means interposed between said inwardly extending planar faces of said first and second interior member intermediate said side faces thereof for supporting said members and forming an air gap,
a plurality of electrodes formed on said outwardly extending faces of said first and second exterior members and on said inwardly extending faces of said first and second interior member,
and said electrodes being located in the zone intermediate said support rod means.
5. In a transducer,
first and second exterior piezoelectric members in the form of a relatively thin rectangular plate each having side edges and including outwardly extending arcuate and inwardly extending planar faces, first and second interior piezoelectric members in the form of a relatively thin rectangular plate each having side edges and including outwardly extending planar and inwardly extending arcuate faces, said planar face of said first exterior member being conductively bonded to said planar face of said first interior member, said planar face of said second exterior member being conductively bonded to said planar face of said second interior member, said arcuate faces of said exterior member and said arcuate faces of said interior members having a plurality of spaced, integrally formed support legs thereon extending parallel to said side faces, said support legs formed on said arcuate faces of said interior members being adhesively joined in mutual abutment thereby forming an air gap, and said arcuate faces intermediate said support progressively varying in distance from the associated planar face thereof and having its greatest distance at a point substantialy intermediate adjacent support legs.

References Cited by the Examiner
UNITED STATES PATENTS

| | | | |
|---|---|---|---|
| 3,002,179 | 9/61 | Kuester | 310—8.6 |
| 3,048,815 | 8/62 | Thurston et al. | 310—8.6 |
| 3,054,084 | 9/62 | Parssinen et al. | 310—8.6 |

MILTON O. HIRSHFIELD, *Primary Examiner.*

UNITED STATES PATENT OFFICE
CERTIFICATE OF CORRECTION

Patent No. 3,158,162                                                           November 24, 1964

John J. Horan

It is hereby certified that error appears in the above numbered patent requiring correction and that the said Letters Patent should read as corrected below.

Column 5, line 66, for "annual" read -- annular --; column 6, line 8, for "outer" read -- other --.

Signed and sealed this 20th day of April 1965.

(SEAL)
Attest:

ERNEST W. SWIDER                                        EDWARD J. BRENNER
Attesting Officer                                              Commissioner of Patents